(12) United States Patent
Shamir

(10) Patent No.: US 6,603,445 B1
(45) Date of Patent: Aug. 5, 2003

(54) METHOD AND APPARATUS FOR FACTORING LARGE NUMBERS WITH OPTOELECTRONIC DEVICES

(75) Inventor: Adi Shamir, Rehovot (IL)

(73) Assignee: Yeda Research and Development Co. Ltd., Rehovot (IL)

( * ) Notice: Subject to any disclaimer, the term of this patent is extended or adjusted under 35 U.S.C. 154(b) by 0 days.

(21) Appl. No.: 09/475,920

(22) Filed: Dec. 30, 1999

(51) Int. Cl.$^7$ ................................................. G09G 3/04
(52) U.S. Cl. ............................. 345/43; 345/30; 345/44; 345/46; 315/241 P; 250/201.1; 250/201.9; 250/586; 257/139.1; 257/141.1; 257/141.2; 257/141.3
(58) Field of Search .......................... 345/43, 44, 46; 380/30; 315/241 P; 250/586, 201.1, 201.9; 257/139.1, 141.1, 141.2, 141.3

(56) References Cited

U.S. PATENT DOCUMENTS

| | | | | |
|---|---|---|---|---|
| 4,519,046 A | * | 5/1985 | Cole | 364/822 |
| 4,837,822 A | * | 6/1989 | Crosley et al. | 380/23 |
| 5,142,579 A | * | 8/1992 | Anderson | 380/30 |
| 5,295,188 A | * | 3/1994 | Wilson | 380/30 |
| 6,091,819 A | * | 7/2000 | Venkatesan et al. | 380/28 |
| 6,134,325 A | * | 10/2000 | Vanstone et al. | 380/30 |
| 6,141,420 A | * | 10/2000 | Vanstone | 380/30 |
| 6,266,771 B1 | * | 7/2001 | Bellare et al. | 713/176 |
| 6,298,135 B1 | * | 10/2001 | Messerges | 380/1 |
| 6,343,280 B2 | * | 1/2002 | Clark | 705/55 |

* cited by examiner

Primary Examiner—Richard Hjerpe
Assistant Examiner—Abbas Abdulselam
(74) Attorney, Agent, or Firm—Martin Fleit; Paul D. Bianco; Fleit Kain Gibbons Gutman & Bongini P.L.

(57) ABSTRACT

A method and apparatus for factoring large numbers which utilizes an optoelectronic device that has a wafer at one end that contains a plurality of LEDs. Each LED is associated with at least one period $p_j$ and at least one delay $d_j$. A clock drives the plurality of LEDs responsive to clock cycles to flash for one clock cycle at times described by the processing $p_j \cdot r + d_j$ for $r \geq 0$. The light intensity flashed by the LEDs is controlled by a filter to be proportional to $\log_2 (p_j)$, and a photodetector positioned at the other end of the cylinder collects the light flashed by the LEDs.

23 Claims, 3 Drawing Sheets

INVENTION

PC IMPLEMENTATION

METHOD AND APPARATUS FOR FACTORING LARGE NUMBERS WITH OPTOELECTRONIC DEVICES

BACKGROUND OF THE INVENTION

1. Field of Invention

The present invention relates to a method and apparatus for factoring large numbers with optoelectronic devices.

2. Description of the Prior Art

The security of the RSA public key cryptosystem depends on the difficulty of factoring a large number n which is the product of two equal size primes p and q. This problem had been thoroughly investigated (especially over the last 25 years), and the last two breakthroughs were the development of the Quadratic Sieve (QS) algorithm, see C. Pomerance, The quadratic sieve factoring algorithm, Proceedings of EUROCRYPT 84 (LNCS 209), 169–182, 1985, and the development of the Number Field Sieve (NFS) algorithm, see A. K. Lenstra, H. W. Lenstra, M. S. Manasse, and J. M. Pollard, The number field sieve, Vol. 1554 of Lecture Notes in Mathematics, 11–42, Springer Verlag, 1993. The asymptotic time complexity of the QS algorithm and the asymptotic time complexity of the NFS algorithm are different. For numbers with up to about 350 bits the QS algorithm is faster due to its simplicity, but for larger numbers the NFS algorithm is faster due to its better asymptotic complexity.

The complexity of the NFS algorithm grows fairly slowly with the binary size of n. The current record in factoring large RSA keys is the factorization of a 512 bit number achieved in August 1999 by running the Number Field Sieve on several hundred workstations for several months. If we denote by X the (barely possible) complexity of factoring a 512 bit number, the complexity of factoring numbers which are 100 bits longer is about 40X, the complexity of factoring numbers with are 150 bits longer is about 220X, and the complexity of factoring numbers which are 200 bits longer is about 1100X. Accordingly, the main problem confronting researchers in this field is to improve the efficiency of factoring.

SUMMARY OF THE INVENTION

The main object of the present invention is to provide a method and apparatus that can increase the efficiency of the QS or NFS algorithms by one to two orders of magnitude. The main practical significance of such an improvement is that it can make 512 bit numbers (which are the default setting today of most Internet browsers in e-commerce applications) relatively easy to factor. The technique of the present invention is based on a very simple optoelectronic device which can analyse long sequences of large integers, and determine which ones factor completely over a prime base consisting of the first k prime numbers for some large k.

The present inventive method and apparatus is based on a novel optoelectronic device called TWINKLE (The Weizmann INstitute Key Locating Engine). The manufacturing cost of these devices in full production is deemed to be a modest sum. It can be combined with an algorithm, such as, any sieve-based factoring algorithm, and in particular it can be used in both the QS and the NFS algorithms. It uses their basic mathematical structure and inherits their asymptotic complexity, but improves the practical efficiency of their sieving stage by a large constant factor. Since this is the most time consuming part of these algorithms, a major improvement in their total running time is obtained.

Further objects and advantages of the present invention will become readily apparent from the following detailed description of a preferred embodiment of the invention when taken with the appended drawings.

DETAILED DESCRIPTION OF A PREFERRED EMBODIMENT

Figures 1A, 1B:
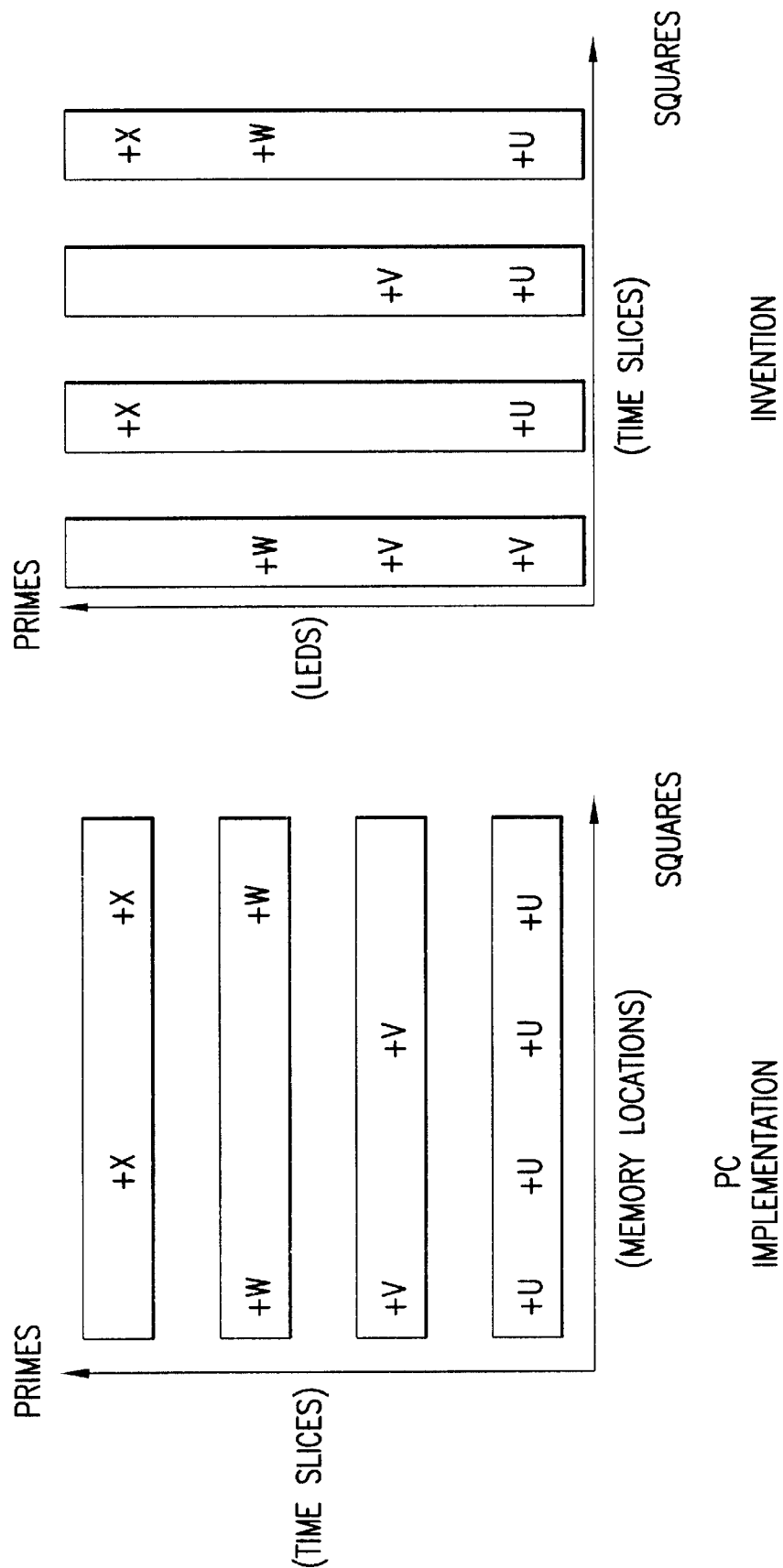
FIGS. 1A and 1B are schematic graphical showings that compare conventional sieving with optical sieving according to the present invention: the boxed operations are carried out at the same time slice.

Referring now to the drawings, the method and apparatus of the present invention will now be described with respect to a detailed preferred embodiment. Initially, there follows a discussion of the QS factoring algorithm.

Given the RSA number n=pq, the QS algorithm tries to construct two numbers y and z, such that, y≠z (mod n) and $y^2=z^2$ (mod n). Knowledge of such a pair makes it easy to factor n since gcd(y−z, n) is either p or q. To find such y and x, a large number of values $y_1, y_2, \ldots, y_m$, are generated. To compute each $y_i^2$ (mod n), one tries to factor it into a product of primes $p_j$ from a prime base B consisting of the k smallest primes $p_1=2, p_2=3, \ldots, p_k$. Numbers $y_i^2$ (mod n) which have such factorizations into $\prod_{j=1}^{k} p_j^{e_j}$ are called smooth. If the number of smooth modular squares found in such a way exceeds k, Gauss elimination can be used to find a subset of the vectors $(e_1, e_2, \ldots, e_k)$ of the prime multiplicities which is linearly dependent modulo 2. When the corresponding $y_i^2$ (mod n) and their factorizations are multiplied, an equation is obtained of the form:

$$\prod_{i=1}^{m} (y_i^2)^{b_i} = \prod_{j=1}^{k} p_j^{c_j} (\text{mod } n)$$

where all the $b_i$'s (which define the subset) are 0's and 1's and all the $c_j$'s (which are the sums of the prime multiplicities) are even numbers. The desired equation $y^2=z^2$ (mod n) can now be obtained by defining $$y = \prod_{i=1}^{m} y_i^{b_i} (\text{mod } n)$$

$$z = \prod_{j=1}^{k} p_j^{c_j/2} (\text{mod } n).$$

The key to the efficiency of the QS algorithm is the generation of many small modular squares whose smoothness is easy to test. Considering the simplest case in which the quadratic polynomial $f(x)=(a+x)^2$ (mod n) where $$a = \lfloor \sqrt{n} \rfloor,$$

by choosing $y_i=a+i$ for $i=1, 2, \ldots, m$, then it is easy to see that for small m the corresponding $y_i^2=f(i)$ (mod n) are half size modular squares which are much more likely to be smooth numbers than random modular squares.

The simplest way of testing the smoothness of the values in such a sequence is to perform trial division of each value in the sequence by each prime in the basis. Since the f(i)'s are hundreds of bits long, this is very slow.

The QS algorithm expresses all the generated f(1), ..., f(m) in the non modular form $f(i)=(a+i)^2-n$ (since m is small), and determines which of these values are divisible by $p_j$ from the basis B by solving the quadratic modular equation $(a+i)^2-n=0 \pmod{p_j}$. This is easy, since the modulus $p_j$ is quite small. In this respect, the issue of the divisibility of f(i) by higher powers of $p_i$ is ignored, since except for the smallest primes in the basis this is extremely unlikely, and the powers of the first few primes can be added to the basis without substantially increasing its size.

The quadratic equation mod $p_j$ will have either zero or two solutions $d_i'$ and $d_i''$. In the first case, it is deduced that none of the f(i)'s will be divisible by $p_j$, and in the second case, it is deduced that f(i) will be divisible by $p_j$ if and only if i belongs to the union of the two arithmetic progressions $p_j \cdot r + d_i$ and $p_j \cdot r + d_i$ for $r \geq 0$.

The smoothness test in the QS algorithm is based on an array A of m counters, where the i-th entry is associated with f(i). The sieving algorithm zeroes all these counters, and then loops over the primes in the basis. For each prime $p_j$, and for each one of its two arithmetic progressions (if they exist), the algorithm scans the counter array, and adds the constant $\log_2(p_j)$ to all the counters A (i) whose indices i belong to the arithmetic progression (there are about $m/p_j$ such indices). At the end of this loop, the value of A(i) describes the (approximate) binary length of the largest divisor of f(i) which factors completely over the prime base B. The algorithm then scans the array, finds all the entries i for which A(i) is close to the binary length of f(i), tests that these f (i)'s are indeed smooth by trial division, and uses them in order to factor n.

Typical large scale factoring attacks with networks of PC's may use m=100,000,000 and k=200,000. The array requires 100 megabytes of RAM, and its counter can be accessed at the standard bus speed of 100 megahertz. Faster cache memory is of little use, since the sieving process accesses arithmetic progressions of addresses with huge jumps, which create continuous cache misses. Just scanning such a huge array requires about one second. Well optimized implementations of the QS algorithm perform the sieving in 5 to 10 seconds, and find very few smooth numbers. They then choose a different quadratic polynomial f"(x), and repeat the sieving run (on the same machine, or on a different machine working in parallel). This phase stops when a total of k+1 smooth modular squares are collected in all the sieving runs, and a single powerful computer performs the Gauss elimination algorithm and the actual factorization in a small fraction of the time which was devoted to the sieving.

Figure 3A:
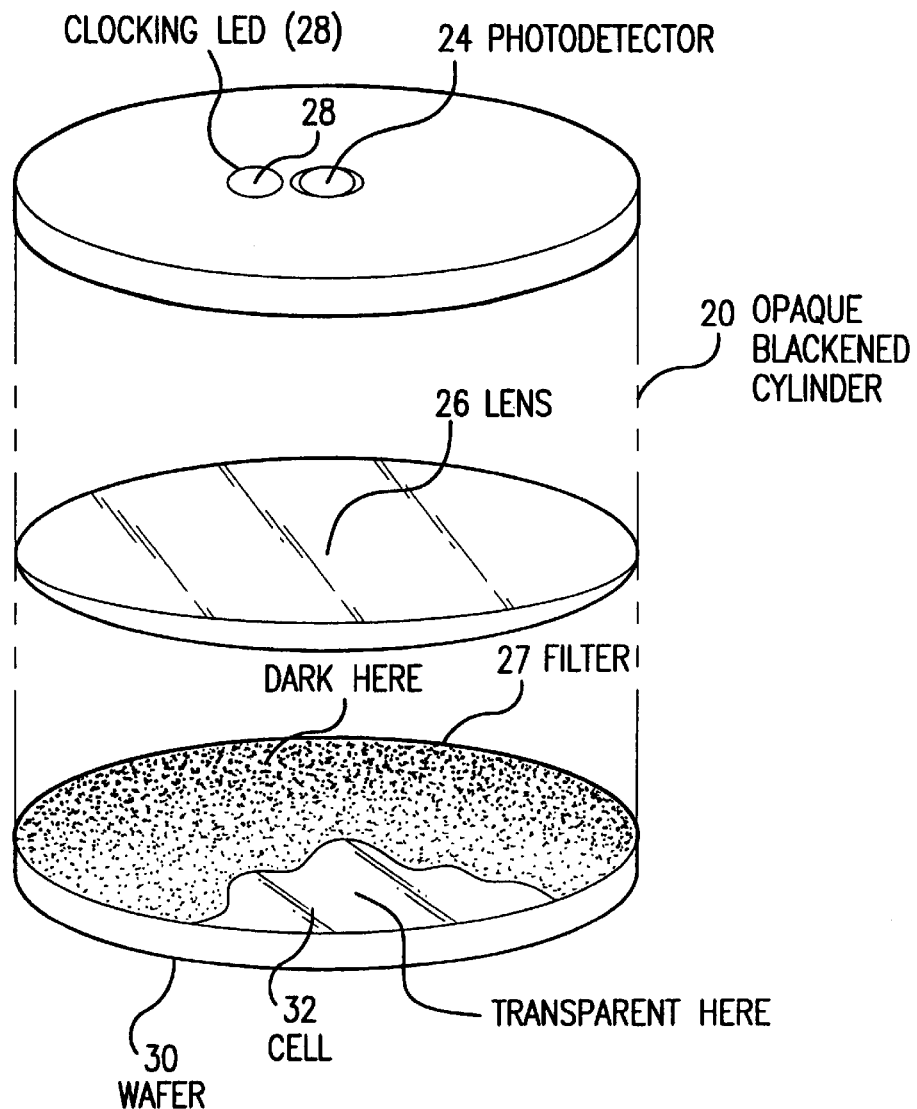
FIG. 3a is a schematic diagram showing the structure of the optoelectronic device according to the present invention.

The novel TWINKLE device, which is an ultrafast optical siever, should cost about the same as a powerful PC or a workstation, but can test the smoothness of 100,000,000 modular squares over a prime base of 200,000 primes in less than 0.1 seconds. This is 50 to 100 times faster than the conventional sieving approach described above. The novel TWINKLE device is an optoelectronic device which is housed in an opaque blackened cylinder 20, see FIG. 3, whose diameter is about 6 inches and whose height is about 10 inches. The bottom of the cylinder consists of a large collection of LEDs 22 (light emitting diodes) carried on a wafer 30. The LEDs twinkle at various frequencies, and the top of the cylinder contains a photodetector 24 which measures the total amount of light emitted at any given moment by all the LEDs. The photodetector 24 alerts a connected PC (not shown) whenever this total exceeds a certain predetermined threshold. Such events are related to the detection of possibly smooth numbers, and their precise timing is the only output of the TWINKLE device. Since these events are extremely rare, the PC can leisurely translate the timing of each reported event to a candidate modular square, verify its smoothness via trial division, and use it in a conventional implementation of the QS or NFS algorithms in order to factor the input n.

The standard PC implementation of the sieving techniques assigns modular squares to array elements (using space) and loops over the primes (using time), see FIG. 1A. The TWINKLE device assigns primes to LEDs (using space) and loops over the modular squares (using time), which reverses their roles. This is schematically described in FIG. 1B.

Each LED 22 is associated with some period $p_j$ and delay $d_j$, and its only role is to light up for one clock cycle at times described by the arithmetic progression $p_j \cdot r + d_j$ for $r \geq 0$. To mimic the QS sieving procedure, non-uniform LED intensities are used. In particular, the LED associated with prime $p_j$ should generate light intensity proportional to $\log_2(p_j)$ whenever it flashes, so that the total intensity measured by the photodetector 24 at time i will correspond to the binary size of the largest smooth divisor of the f(i), again, ignoring the issue of the divisibility of f(j) by higher powers of the primes. This can be achieved by using an array of LEDs 22 of different sizes or with different resistances. However, a simpler and more elegant solution to the problem is to construct a uniform array of identical LEDs, to assign similar sized primes to neighbouring LEDs, and to cover the LED array with a transparent filter 27 with smoothly changing gray levels. For example, primes can be assigned to LEDs in row major order and a filter 27, see FIG. 3a, used which is dark gray at the top, and completely transparent at the bottom, or primes can be assigned to LEDS in spiral order and a filter used which is darkest at its center. Note that the dynamic range of gray levels one must use is quite limited, since the ratio of the logs of the largest and the smallest primes in a typical basis does not exceed 24:1. Filter 27 is located immediately above the wafer 30 so that light from each LED passes through the area of the filter immediately above it.

To increase the sensitivity of the photodetector 24, it can be placed behind a large lense 26 which concentrates all the incoming light on its small surface area, i.e. the photodetector is at the focal point of lens 26. The light intensity measurement is likely to be influenced by many sources of errors. For example, the gray levels of the filter 27 are only approximations of the logs, and even uniformly designed LEDs may have actual intensities varying by 20% or more. The accuracy of the TWINKLE device can be improved by measuring the actual filtered intensity of each LED in the manufactured array, and assigning the sequence of primes to the various LEDs based on their sorted list of measured intensities. However, the QS and NFS factoring algorithms are very forgiving to such measurement errors, and in PC implementations they use crude integer approximations to the logs in order to speed up the computation. There are two possible types of errors: missed events and false alarms. To minimize the number of missed events a slightly lower reporting threshold is set, and to eliminate the resultant false alarms all the reported events are later tested on a PC in order to find the extremely rare real events among the rare false alarms. For typical values of the parameters, the average binary size of the smooth part of candidate values is about one tenth of their size, and only a tiny fraction of all candidate values have ratios exceeding one half. As a result, the desired events stand out very clearly as isolated narrow peaks which are about ten times higher than the background noise.

Optical sieving according to the invention is much better than conventional counter array sieving for the following reasons:

1. Optical sieving can be performed at an extremely fast clock rate. Typical silicon RAM chips in standard PC's operate at about 100 megahertz. LEDs, on the other hand, are manufactured with a much faster Gallium Arsenide (GaAs) technology, and can be clocked at rates exceeding 1 gigahertz without difficulty. Commercially available LEDs and photodetectors are used to send 10 gigabits per second along fiber optic cables, and GaAs devices are widely used at similar clock rates as routers in high speed networks.

2. Hundreds of thousands of optical contributions can be added instantaneously, if perfect accuracy is not needed, whereas building a digital adder with 200,000 inputs which computes their sum in a single clock cycle is completely unrealistic.

3. The optical technique of the present invention does not need huge arrays of counters. Instead of using one memory cell per sieved value, one time slice per sieved value can be used. Even with the declining cost of fast memories, time is cheaper than space.

4. In the optical technique of the present invention there is no necessity to scan the array at the beginning in order to zero it, nor any necessity to scan the array again at the end in order to find its high entries—both operations are done at no extra cost during the actual sieving.

Figure 2:
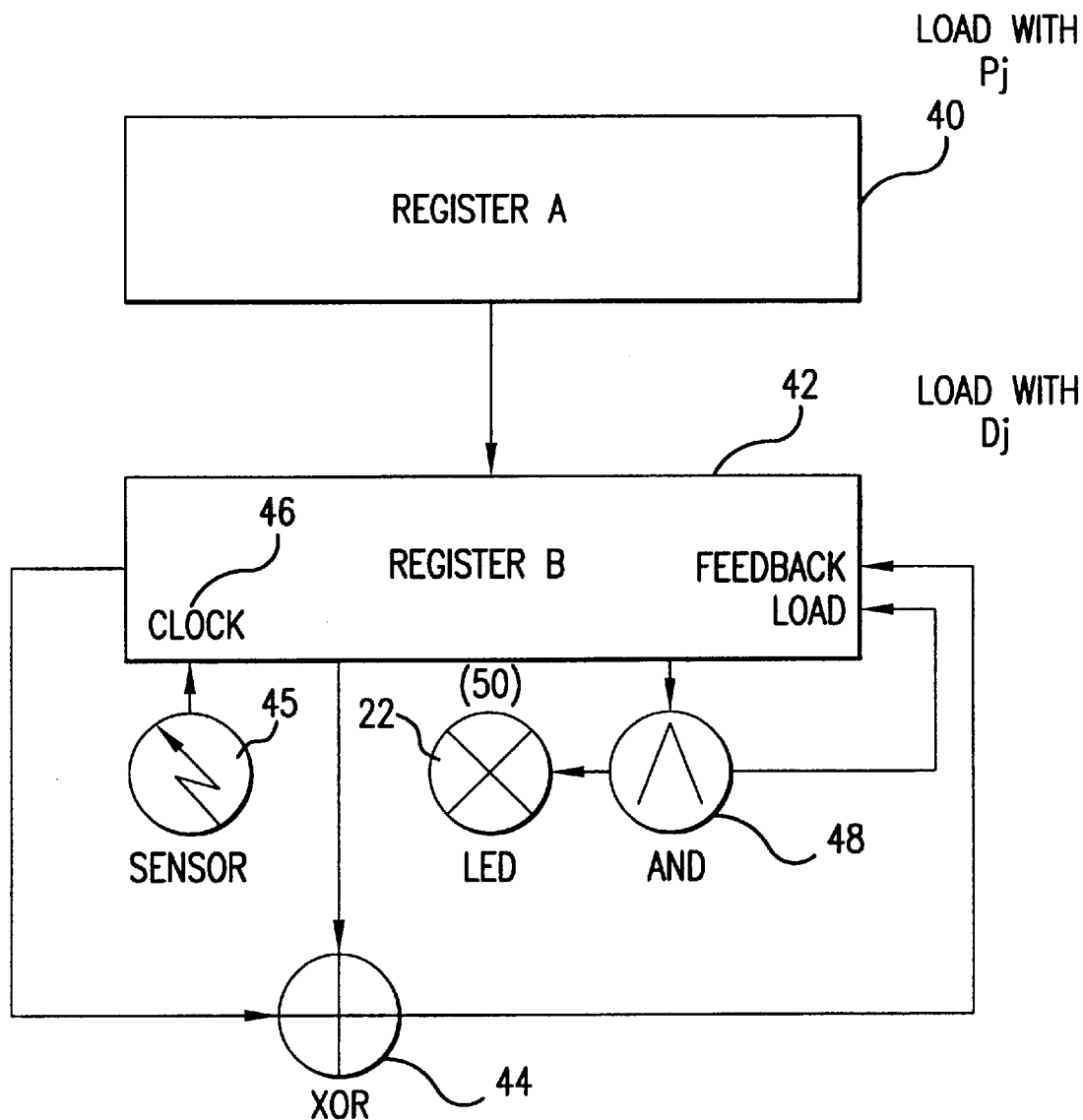
FIG. 2 is a schematic diagram in block form showing the organization of a single cell in an array according to the present invention.

Referring to FIG. 2, the array of LEDs 22 is implemented on a single wafer 30 of GaAs. Each cell 32 on this wafer contains one LED 22 plus some circuitry which makes it flash for exactly one clock cycle every exactly $p_j$ clock cycles with an initial delay of exactly $d_j$ clock cycles. The high clock rate and extremely accurate timing requirements rule out analog control methods, and the unavoidable existence of bad cells in the wafer rules out a prewired assignment of primes to cells. Instead, identical cells are used throughout the wafer, and included in each cell are two registers, A and B, 40 and 42, see FIG. 2, which are loaded before the beginning of the sieving process with values corresponding to $p_j$ and $d_j$, respectively. Also a sensor 45 is included to receive signals from a clocking LED and drive a clock 46 included in the circuitry. For a typical sieving run with primes which are all smaller than 8,000,000, only 23 bits are needed in each one of these registers.

The structure of each cell (shown in FIG. 2) is very simple. The counting can be carried out in standard binary counters in which all the stages count synchronously, or in ripple counters in which the carries ripple through the counter in an asynchronous way. A simpler solution is to count with a maximal length linear feedback shift register B, 42, which is based on a single XOR 44 of two of its bits. It is driven by the clock 46, and runs until it enters the special state in which all its bits are "1". When this is recognized by the AND 48 of all the bits of register B 42, the LED 50 (22) flashes, and register B 42 is reloaded with the contents of register A 40 (which remains unchanged throughout the computation). The initial values loaded into registers A and B are not the binary representations of $p_j$ and $d_j$, but the (easily computed) states of the shift register which are that many steps before the special state of all "1".

Figure 3B:
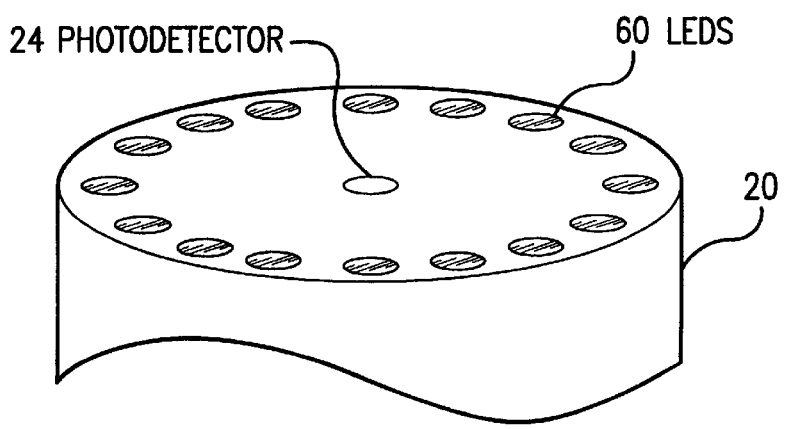
FIG. 3b is a schematic diagram like FIG. 3a showing a variation.

An important issue in such a high speed device is clock synchronization. Each clock cycle lasts less than a nanosecond, and all the light pulses must be synchronized to within a fraction of this interval is order to correctly sure their contributions. Distributing electrical clock pulses (which travel slowly over long, high capacity wires) at 1 gigahertz to thousands of cells all over the wafer 30 without skewing their arrival times by more than 100 picoseconds seems to be a very difficult problem. The present invention solves it by using a novel optical arrangement. Since it is possible to construct in GaAs technology a small photodetector 45 in each cell 32, the invention uses optical clock distribution rather than electrical clock distribution. A strong LED 28 is placed opposite the wafer, which flashes at a fixed rate, and its pulses are almost simultaneously picked up by the photodetectors in all the cells, and used to drive the shift registers in a synchronized way, see FIG. 3a. Since light passes about 3 centimeters in 100 picoseconds, the clocking LED 28 and the summing photodetector 24 are placed sufficiently far away from the wafer 30 to guarantee sufficiently similar optical delays to and from all the cells on the flat wafer. To avoid possible confusion between clock and data light pulses, two different wavelengths are used for the two purposes. As shown in FIG. 3b a plurality of LEDs may be used for clocking with the LEDs 60 placed uniformly about the periphery of the cylinder 20.

Computing the AND of 23 inputs requires a tree of depth 3 of 3-input AND gates in AND 48, which may be the slowest cell operation. To speed it up, the invention uses a systolic design which carries out the tree computation in 3 consecutive clock cycles. This delays the detection of the special state by 3 clock cycles, but keeps all the flashing LEDs perfectly synchronized. To compensate for the late reloading of register B, the invention stores a modified value of $p_j$ in register A.

An improved cell design is based on the observation that about half the primes do not yield arithmetic progressions, whereas each prime in the other half yields two arithmetic progressions with the same period $p_j$. In standard PC implementations this has little effect, since one still has to scan on average one arithmetic progression per prime in the basis. However, in the novel TWINKLE design and method the two cells 32 assigned to the same $p_j$ can share the same A register 40 (which never changes) to reload their separate B shift registers 42. In addition, the two cells 32 can share the same LED 50 and flash it with the OR of the two AND gates 48, since the two arithmetic progressions are always disjoint. In the context of the present invention, this is called a double cell, and used to reduce the average number of registers per prime in the basis from 2 to 1.5. Since these registers occupy most of the area of the cell 32, this observation can increase the number of primes handled with a single wafer 30 by almost 33%.

The invention provides a single wafer 30 which can handle a prime base of 200,000 primes (which is the actual size used in recent PC-based factorizations). A standard 6 inch wafer has a total usable area of about $18 \times 10^9$ square microns. Commercially available LED arrays (such as the arrays sold by Oki Semiconductors to manufacturers of laser printers—see http://www.oki.co.jp/OKI/home/English/New/OKI-News/1998/z9819e.html for further details) have a linear density of 1200 LEDs per inch. At this density, each LED occupies a $20\mu \times 20\mu$ square with an area of $400\mu^2$, and about 40,000,000 LEDs can fit on a single wafer. However, most of area of each double cell will be devoted to the three 23 bit registers. Crude conservative estimates indicate that each one of these 69 bits can comfortably fit into an area of $1,600\mu^2$ using commercially available GaAs technology. Thus, the whole double cell can fit into an area of less than $160,000\mu^2$; and 100,000 double cells can be packed into a single wafer. Such a wafer will be able to sieve numbers over a prime base of 200,000 primes.

A simple reality check is based on the computation of the total amount of memory on the wafer. The 100,000 double cells contain 69×100,000 bits, or less than one megabyte of memory. The other gates (XOR, AND) and diodes (LEDs, photodetectors) occupy a small additional area. This is a very modest goal for wafer scale designs.

The cost of manufacturing silicon wafers in a commercial FAB is about $1,500 per wafer, and the cost of manufacturing the more expensive GaAs wafers is about $5,000 per wafer (excluding design costs and assuming a reasonably large order of wafers). This is comparable to the cost of a strong workstation, but provides a sieving efficiency which is several orders of magnitude higher.

The novel TWINKLE device does not have a yield problem, which plagues many other wafer-scale designs: During the sieving process each cells works completely independently, without receiving any inputs or sending any outputs to neighbouring cells. Even if 20% of the cells are found to be defective in postproduction inspection, the remaining 80% of the cells can be used. If necessary, two or more wafers can be placed at the same distance opposite the same summing detector, in order to compensate for defective cells or to sieve over larger prime bases.

After determining the number of cells, registers A and B in each cell are loaded with precomputed data from a connected storage device. Silicon memory cannot operate at gigahertz rates, and thus the clocking LEDs facing the GaAs wafer needs to be slowed down during the loading phase. The A registers which contain the primes assigned to each LED can be loaded only once after each powerup, but the B registers which contain the initial delays have to be loaded for each sieving run. The total size of the 200,000 B registers is about 575 kilobytes. Such a small amount of data can be kept in a standard type of silicon memory, and transferred to the wafer in 0.002 seconds on a 23 bit bus operating at 100 megahertz. This is a small fraction of the time required to carry out the actual sieving, and thus, it does not create a new speed bottleneck.

The proposed wafer design has just 27 external connections: two for power, two for control, and 23 for the input bus. The four modes of operation induced by the two control wires consist of a test mode (in which the various LEDs are sequentially flashed to test their functionality and measure their light intensity), LOAD-A mode (in which the various A registers are sequentially loaded from the bus), LOAD-B mode (in which the various B registers are sequentially loaded from the bus), and sieving mode (in which all the shift registers are simultaneously clocked at the full clock rate). The optical clocking during mode changes can be briefly frozen in order to enable the slow electric control signals to propagate to all the cells on the wafer before starting operating in the new mode.

Another important factor in the wafer design is its total power consumption. Strong LEDs consume considerable amounts of power, and if a large number of LEDs on the wafer flash simultaneously, the excessive power consumption can skew the intensity of the flashes. However, each tested number can be divisible by at most several hundred primes from the basis, and thus, there is provided a small upper bound on the total power which can be consumed by all the LEDs at any given moment in the sieving process.

As previously noted, the novel TWINKLE device is housed in an opaque cylinder 20 with the wafer 30 at the bottom and the summing photodetector 24 and clocking LED 28 at the top. Its diameter is determined by the size of the wafer, which is about 6 inches. Its height is determined by focal length of the convex lense 26 in the box, which can be less than 10 inches. If we place the clocking LED 28 and summing photodetector 24 at the focal point of the lense, then it is easy to prove that the time it takes for any light ray to get from the LED through the lense to the wafer, and from the wafer through the lense to thephotodetector, are completely uniform.

Although the invention has been shown and described in terms of specific preferred embodiments, nevertheless changes and modifications are possible which do not depart from the spirit, scope and teachings of the invention. Such changes and modifications which are apparent to those skilled in the art are deemed to fall within the purview of the invention as claimed.

What is claimed is:

1. A method for use in factoring large numbers comprising the steps of:
   a) establishing a plurality of LEDs in a common plane;
   b) associating each LED number j at least one period Pj and at least one delay dj;
   c) establishing a clock cycle;
   d) driving the plurality of LEDs responsive to the clock cycle to flash for one clock cycle at times described by the progression Pj*f+dj for $r \geq 0$;
   e) controlling the light intensity flashed by LEDs to be proportional to log2 (Pj); and
   f) collecting the light flashed by the LEDs to alert a connected computer whenever the total light received exceeds a predetermined threshold for implementing with a QS or NFS algorithm.

2. The method of claim 1 wherein the LEDs are contained in an enclosure.

3. The method of claim 1 wherein at least some of the LEDs are of different sizes.

4. The method of claim 1 wherein at least some of the LEDs are of different resistances.

5. The method of claim 1 wherein the LEDs are of uniform size and resistance.

6. The method of claim 1 including the further step of filtering the light flashed by the LEDs.

7. The method of claim 6 including the step of filtering through a transparent element with smoothly changing gray levels.

8. The method of claim 1 including the further step of assigning primes to the LEDs.

9. The method of claim 8 wherein the assignment is on the basis of similar sized primes being assigned to neighboring LEDs.

10. The method of claim 9 including the further steps of testing the LEDs to determine their measured intensities, and assigning the sequence of primes on the basis of tested intensity.

11. The method of claim 1 wherein the clock cycle is established by a flashing LED.

12. The method of claim 11 wherein the clocking LED and photodetector are placed in the vicinity of the focal point of a lense placed in the enclosure parallel to the plane of the LEDs.

13. Apparatus for use in processing large numbers comprising:
   a) an enclosure;
   b) a plurality of LEDs located within the enclosure;
   c) a clocking mechanism for setting a clock cycle;

d) circuitry for driving the LEDs responsive to the clock cycle to flash for one clock cycle at predetermined times;

e) means for controlling the light flashed by the LEDs; and f) a photodetector located in spaced relation to the LEDs within the enclosure to collect light flashed by the LEDs to alert a connected computer whenever the total light received exceeds a predetermined threshold for implementing with a QS or NFS algorithm.

14. Apparatus according to claim 13 wherein each LED number j is associated with at least one period $p_j$ and at least one delay $d_j$.

15. Apparatus according to claim 14 wherein the circuitry drives the LEDs to flash for one clock cycle at times described by each one of the progressions $p_j \cdot r + d_j$ for $r \geq 0$.

16. Apparatus according to claim 13 wherein the enclosure is a cylinder.

17. Apparatus according to claim 16 wherein the LEDs are defined on a wafer located at one end of the cylinder.

18. Apparatus according to claim 17 wherein the photodetector is located at the other end of the cylinder.

19. Apparatus according to claim 18 wherein the clocking mechanism is established by a LED located at the other end of the cylinder, and the LEDs have associated with them photodetectors to receive flashes of light from the LED located at the other end.

20. Apparatus according to claim 13 wherein means for controlling the intensity of the light flashed by the LEDs is a filter.

21. Apparatus according to claim 17 wherein the circuitry is defined on the wafer.

22. Apparatus according to claim 13 wherein the circuitry includes a shift register, an XOR gate and an AND gate.

23. Apparatus according to claim 19 wherein the clocking LED and the photodetector are placed in the vicinity of the focal point of a lense placed in the enclosure parallel to the plane of the wafer.

* * * * *